(12) United States Patent
Rabinowitz

(10) Patent No.: US 12,191,901 B2
(45) Date of Patent: Jan. 7, 2025

(54) LIGHTWEIGHT COMMUNICATION HANDSET

(71) Applicant: Moses Rabinowitz, Brattleboro, VT (US)

(72) Inventor: Moses Rabinowitz, Brattleboro, VT (US)

(73) Assignee: Moses Rabinowitz, Brattleboro, VT (US)

( * ) Notice: Subject to any disclaimer, the term of this patent is extended or adjusted under 35 U.S.C. 154(b) by 300 days.

(21) Appl. No.: 17/862,702

(22) Filed: Jul. 12, 2022

(65) Prior Publication Data
US 2024/0022277 A1    Jan. 18, 2024

(51) Int. Cl.
    *H04B 1/3827*      (2015.01)
    *H04W 4/10*       (2009.01)

(52) U.S. Cl.
    CPC ............ *H04B 1/3833* (2013.01); *H04W 4/10* (2013.01)

(58) Field of Classification Search
    CPC ................................ H04B 1/3833; H04W 4/10
    See application file for complete search history.

(56) References Cited

U.S. PATENT DOCUMENTS

| | | |
|---|---|---|
| 2,385,339 A | 9/1945 | Atkins |
| 9,503,867 B2 | 11/2016 | Wong |
| 2013/0281034 A1* | 10/2013 | Mazzeo ............... H04M 1/0214 455/90.2 |
| 2015/0163588 A1* | 6/2015 | Johansen ............... H04R 1/326 381/92 |
| 2022/0400359 A1* | 12/2022 | Mazzeo ............... H04M 1/0214 |

OTHER PUBLICATIONS

IEEE Standard 315-1975, "Graphic Symbols for Electrical and Electronics Diagrams (Including Reference Designtion Letters)," IEEE Standards Coordinating Committee 11, Dec. 2, 1993. 264 pages.
MIL-DTL-5423/15J, "Detail Specification Sheet: Boot, Dust and Water Seal, Type B (For Toggle and Pushbotton Switches, Circuit Breakers, and Rotary-Actuated Parts) (For Handset Switches), Style 5," Aug. 9, 2019. 5 pages.

(Continued)

*Primary Examiner* — Nguyen T Vo
(74) *Attorney, Agent, or Firm* — Wilmer Cutler Pickering Hale and Dorr LLP

(57) ABSTRACT

A tactical communication handset that is lighter, easier to assemble, and more durable than standard tactical handsets is disclosed. The communication handset includes a housing, an earphone, a microphone, a push-to-talk (PTT) switch, a pin contact electrical connector, and connection wires. The housing includes an earphone cavity, a microphone cavity, a PTT switch cavity, and a pin contact electrical connector cavity; however, the housing does not include a terminal cavity. The connection wires may be installed with a metal ring terminal or soldered at terminals. The pin contact electrical connector may be a 5-pin or a 6-pin contact electrical connector. The six-pin contact electrical connector enables simultaneous activation of the earphone and microphone of the communication handset.

20 Claims, 6 Drawing Sheets

(56) References Cited

OTHER PUBLICATIONS

MIL-DTL-55116/10C with Amendment 1, "Detail Specification Sheet: Connector, Receptacle, Six-Pin Audio, Solder Cup Spring Terminals, Panel Mount, U-183 Type," Mar. 31, 2019. 4 pages.
MIL-DTL-55116/9C with Amendment 1, "Detail Specification Sheet: Connector, Receptacle, Five-Pin Audio, Solder Cup Spring Terminals, Panel Mount, U-183 Type," May 9, 2019. 4 pages.
MIL-DTL-55116D with Amendment 3, "Detail Specification: Connectors: Miniature Audio, Five-Pin and Six-Pin General Specification for," Nov. 15, 2019. 21 pages.
MIL-PRF-49078A(CR), "Performance Specification: Handset H-250( )/U", Oct. 9, 1997. 11 pages.
MIL-STD-15-1A Notice-1, "Military Standard: Graphic Symbols for Electrical and Electronics Diagrams," U.S. Department of Defense, Aug. 12, 1968. 1 page.
MIL-STD-15-1A, "Military Standard: Graphic Symbols for Electrical and Electronics Diagrams," U.S. Department of Defense, May 22, 1963. 82 pages.
TM 11-5965-280-15, "Operator, Organizational DS, GS, and Depot Maintenance Manual Including Repair Parts and Special Tools List: Handset H-189/GR," Department of the Army Technical Manual, Oct. 1966. 49 pages.
Military Radio Telephone Handset H-22B/U Signal Corps, eBay. 4 pages. Last updated on Oct. 9, 2019. (https://www.ebay.com/itm/163014227416).
U.S. Navy: Bureau of Naval Personnel Standards and Curriculum Division, "Communications and Alarm Systems," Chapter 16: Submarine Electrical Installations, Navpers 16162, Jun. 1946, pp. 211-221. 26 pages. (https://maritime.org/doc/fleetsub/elect/chap16.htm).
USSR Army Military Telephone Receiver Handset, Field Radio Operator Handset, eBay. 3 pages. Last updated on Dec. 4, 2021. (https://www.ebay.com/i/183821191912?chn=ps&norover=1&mkevt=1&mkrid=711-117182-37290-0&mkcid=2&itemid=183821191912&targetid=915282956376&device=c&mktype=pla&googleloc=9001969&poi=&campaignid=10454925350&mkgroupid=109413763091&rlsatarget=pla-915282956376&abcId=2145999&merchantid=114620323&gclid=Cj0KCQjwo6D4BRDgARIsAA6uN1_0w_Zy16YHDqnxznP1tvGcTIJtj2OKCbZI-TdPpsCU73WhH-oEmKoaAuDcEALw_wcB).
ALGO, "1085-500 Mitel 5300 Series Charcoal PTT, Part# 1085-500," SuperTech Supplies. 2 pages. First date on Webarchive Mar. 16, 2015. (https://www.supertechsupplies.com/algo-1085-500-mitel-5300-series-charcoal-ptt-part-no-1085-500/).
Clarity, "50294-001 Push-To-Signal 6-Wire Telephone Handsets for Radio Dispatch," ABC Conferencing. 2 pages. (http://www.abcconf.com/Store/pc/viewPrd.asp?idproduct=25013) ,2022.
Clarity, "PTT-KM-EM80-00 Walker Handset," Adorama. 4 pages. (https://www.adorama.com/clrpttkmem8.html?utm_source=adlgbase) , Jul. 11, 2022.
Contelco, "Signal Corps U.S. Army Handset H-94/U 3168-PH-52," WorthPoint. 6 pages., Jul. 11, 2022(https://www.worthpoint.com/worthopedia/world-war-ii-radio-handset-94-ham-1822708459).
Headset Zone, "50259.001 Walker PTT-K-M-00 Push-To-Talk Telephone Handsets K-Style". 4 pages. First date on Webarchive Jul. 5, 2004. (https://www.headsetzone.com/pttkm.html).
Joiwo, "Joiwo Emergency switch push button lockout ptt function retro handset A15," Ningbo Joiwo Explosion Proof Science & Technology Co., Ltd. 2 pages. (https://pdf.directindustry.com/pdf/joiwo-explosion-proof-science-technology/joiwo-emergency-switch-push-button-lockout-ptt-function-retro-handset-a15/85303-861305.html), Jul. 11, 2022.
Military Radio Telephone Handset H-22B/U Signal Corps, eBay. 4 pages. Last updated on Sep. 10, 2019. (https://www.ebay.com/itm/163014227416).
NEC, "ITZ / DTZ PTT Handset (BK), Push-to-Talk Handset for Digital & IP endpoints. For DT300 digital endpoints. Part# 660125," Telecom Creations. 5 pages. (https://telecomcreations.com/collections/univerge-sv9100/products/NEC-itz-dtz-ptt-handset-bk- 7push-to-talk-handset-for-digital-ip-endpoints-for-dt300-digital-endpoints-part-660125).
Railroad Handset Component Parts, Telephone Components. 1 page. First date on Webarchive Oct. 6, 1999. (http://www.telephonecomponents.com/railroad.html); (https://web.archive.org/web/19991006020851/http://www.telephonecomponents.com/railroad.html).
Siniwo, "USB interface telephone electronic Push to talk K style handset-A23," Siniwo. 7 pages. (https://www.siniwo.com/usb-interface-telephone-electronic-push-to-talk-k-style-handset-a23.html).

\* cited by examiner

LIGHTWEIGHT COMMUNICATION HANDSET

TECHNICAL FIELD

The present disclosure relates to a communication handset.

BACKGROUND

Tactical communication handsets are designed to operate reliably in harsh environments. Because they are intended for rugged conditions these handsets are overdesigned to prevent mechanical and electrical failures that lead to communication failures. This ruggedized design has a tradeoff though—these handsets are bulky, resource-intensive to manufacture, and a permanently assembled consumable product. When the handset is critically damaged or fails, as a permanently assembled consumable product, the handset unit is discarded.

SUMMARY

Embodiments of the disclosure relate to a tactical communication handset that is lightweight, easy to manufacture, durable, and/or low-cost.

According to certain embodiments, a lightweight communication handset includes a housing, an earphone, a microphone, a push-to-talk (PTT) switch, a pin contact electrical connector, and connection wires. The housing includes an earphone cavity, a microphone cavity, a PTT switch cavity, and a pin contact electrical connector cavity; however, the housing does not include a terminal cavity. The earphone is located at least partially within the earphone cavity and includes earphone electrical terminals with a first earphone electrical terminal and a second earphone electrical terminal. The microphone is located at least partially within the microphone cavity and includes microphone electrical terminals with a first microphone electrical terminal and a second microphone electrical terminal. The push-to-talk (PTT) switch is located at least partially within the PTT switch cavity and has PTT switch electrical terminals with a first PTT electrical terminal, a second PTT electrical terminal, a third PTT electrical terminal, and a fourth PTT electrical terminal. The pin contact electrical connector is located at least partially within the pin contact electrical connector cavity and has electrical connector pins with electrical connector pin A, electrical connector pin B, electrical connector pin C, electrical connector pin D, and electrical connector pin E. Connection wires include a first connection wire, a second connection wire, a third connection wire, a fourth connection wire, a fifth connection wire, a sixth connection wire, and a seventh connection wire. The first connection wire directly connects the first earphone electrical terminal to the first PTT electrical terminal. The second connection wire directly connects the second earphone electrical terminal to the electrical connector pin B. The third connection wire directly connects the first microphone terminal to the electrical connector pin A. The fourth connection wire directly connects the second microphone electrical terminal to the fourth PTT electrical terminal. The fifth connection wire directly connects the first PTT electrical terminal to the electrical connector pin A. The sixth connection wire directly connects the third PTT electrical terminal to the electrical connector pin C. The seventh connection wire directly connects the second PTT electrical terminal to the electrical connector pin D. The PTT switch, when not depressed, is configured to cause the earphone to be activated. The PTT switch, when depressed, is configured to electrically connect the third PTT electrical terminal to the first PTT electrical terminal, and the fourth PTT electrical terminal to the second PTT electrical terminal, and thereby causing the microphone to be activated.

In certain embodiments, at least one end of the connection wires is installed with a metal ring terminal.

In certain embodiments, the first connection wire is soldered at the first PTT terminal, the fifth connection wire is soldered at the first PTT terminal, the sixth connection wire is soldered at the third PTT terminal, and the seventh connection wire is soldered at the second PTT terminal.

In certain embodiments, the pin contact electrical connector further comprises an electrical connector pin F.

In certain embodiments, the housing further comprises channels or grooves for holding and securing one or more of the connection wires.

In certain embodiments, a method of producing the lightweight communication handset involves: molding a base of the housing; installing the earphone within the earphone cavity, the microphone within the microphone cavity, the PTT switch within the PTT switch cavity, and the pin contact electrical connector within the pin contact electrical connector cavity; directly connecting each of the respective connection wires to the respective earphone electrical terminals, microphone electrical terminals, PTT switch electrical terminals, and electrical connector pins; and molding a top of the housing to the base of the housing to enclose the earphone, the microphone, the PTT switch, and the pin contact electrical connector.

In certain embodiments, the method of producing the lightweight communication handset further involves directly molding the PTT switch, the pin contact electrical connector, and the connection wires into the housing.

In certain embodiments, a lightweight communication handset includes a housing, an earphone, a microphone, a push-to-talk (PTT) switch, a pin contact electrical connector, and connection wires. The housing includes an earphone cavity, a microphone cavity, a PTT switch cavity, and a pin contact electrical connector cavity; however, the housing does not include a terminal cavity. The earphone is located at least partially within the earphone cavity and includes earphone electrical terminals with a first earphone electrical terminal and a second earphone electrical terminal. The microphone is located at least partially within the microphone cavity and includes microphone electrical terminals with a first microphone electrical terminal and a second microphone electrical terminal. The push-to-talk (PTT) switch is located at least partially within the PTT switch cavity and has PTT switch electrical terminals with a first PTT electrical terminal, a second PTT electrical terminal, a third PTT electrical terminal, and a fourth PTT electrical terminal. The pin contact electrical connector is located at least partially within the pin contact electrical connector cavity and has electrical connector pins with electrical connector pin A, electrical connector pin B, electrical connector pin C, electrical connector pin D, electrical connector pin E, and electrical connector pin F. Connection wires include a first connection wire, a second connection wire, a third connection wire, a fourth connection wire, a fifth connection wire, a sixth connection wire, a seventh connection wire, and an eighth connection wire. The first connection wire directly connects the first earphone electrical terminal to the electrical connector pin B. The second connection wire directly connects the second earphone electrical terminal to the electrical connector pin A. The third connection wire directly connects the first microphone electrical terminal to the electrical connector D. The fourth connection wire directly connects the second microphone electrical terminal to the fourth PTT electrical terminal. The fifth connection wire directly connects the first PTT electrical terminal to the electrical connector pin C. The sixth connection wire directly connects the second PTT electrical terminal to the third PTT electrical terminal. The seventh connection wire directly connects the third PTT electrical terminal to the electrical connector pin A. The eighth connection wire directly connects the fourth PTT electrical terminal to the electrical connector pin F. The PTT switch, when not depressed, is configured to cause the earphone to be activated. The PTT switch, when depressed, is configured to electrically contact the third PTT electrical terminal to the first PTT electrical terminal, and the fourth PTT electrical terminal to the second PTT electrical terminal, and thereby causing the earphone and the microphone to be simultaneously activated.

In certain embodiments, at least one end of the connection wires is installed with a metal ring terminal.

In certain embodiments, the fourth connection wire is soldered at the fourth PTT electrical terminal, the fifth connection wire is soldered at the first PTT electrical terminal, the sixth connection wire is soldered at the second PTT electrical terminal and the third PTT electrical terminal, the seventh connection wire is soldered at the third PTT electrical terminal, and the eighth connection wire is soldered at the fourth PTT electrical terminal.

In certain embodiments, the housing further comprises channels or grooves for holding and securing one or more of the connection wires.

In certain embodiments, a method of producing the lightweight communication handset involves: molding a base of the housing; installing the earphone within the earphone cavity, the microphone within the microphone cavity, the PTT switch within the PTT switch cavity, and the pin contact electrical connector within the pin contact electrical connector cavity; directly connecting each of the respective connection wires to the respective earphone electrical terminals, microphone electrical terminals, PTT switch electrical terminals, and electrical connector pins; and molding a top of the housing to the base of the housing to enclose the earphone, the microphone, the PTT switch, and the pin contact electrical connector.

In certain embodiments, the method of producing the lightweight communication handset further involves directly molding the PTT switch, the pin contact electrical connector, and the connection wires into the housing.

In certain embodiments, a lightweight communication handset includes a housing, an earphone, a microphone, a push-to-talk (PTT) switch, a pin contact electrical connector, and connection wires. The housing includes an earphone cavity, a microphone cavity, a PTT switch cavity, a pin contact electrical connector cavity, an audio jack cavity, and a potentiometer cavity; however, the housing does not include a terminal cavity. The earphone is located at least partially within the earphone cavity and includes earphone electrical terminals with a first earphone electrical terminal and a second earphone electrical terminal. The microphone is located at least partially within the microphone cavity and includes microphone electrical terminals with a first microphone electrical terminal and a second microphone electrical terminal. The push-to-talk (PTT) switch is located at least partially within the PTT switch cavity and has PTT switch electrical terminals with a first PTT electrical terminal, a second PTT electrical terminal, a third PTT electrical terminal, and a fourth PTT electrical terminal. A pin contact electrical connector is located at least partially within the pin contact electrical connector cavity and has electrical connector pins with electrical connector pin A, electrical connector pin B, electrical connector pin C, electrical connector pin D, and electrical connector pin E. An audio jack is located at least partially within the audio jack cavity and has audio jack electrical terminals with a first audio jack electrical terminal and a second audio jack electrical terminal. A potentiometer is located at least partially within the potentiometer cavity and has potentiometer electrical terminals with a first potentiometer electrical terminal and a second potentiometer electrical terminal. Connection wires include a first connection wire, a second connection wire, a third connection wire, a fourth connection wire, a fifth connection wire, a sixth connection wire, a seventh connection wire, an eighth connection wire, a ninth connection wire, a tenth connection wire, and an eleventh connection wire. The first connection wire directly connects the first earphone electrical terminal to the first PTT electrical terminal. The second connection wire directly connects the second earphone electrical terminal to the second audio jack terminal. The third connection wire directly connects the first microphone electrical terminal to the electrical connector pin A. The fourth connection wire directly connects the second microphone terminal to the fourth PTT electrical terminal. The fifth connection wire directly connects the first PTT electrical terminal to the electrical connector pin A. The sixth connection wire directly connects the third PTT electrical terminal to the electrical connector pin C. The seventh connection wire directly connects the second PTT electrical terminal to the electrical connector pin D. The eighth connection wire directly connects the first audio jack electrical terminal to the first PTT electrical terminal. The ninth connection wire directly connects the second audio jack electrical terminal to the second potentiometer electrical terminal. The tenth connection wire directly connects the second potentiometer electrical terminal to the third potentiometer electrical terminal. The eleventh connection wire directly connects the first potentiometer electrical terminal to the electrical connector pin C. The PTT switch, when not depressed, is configured to cause the earphone to be activated. The PTT switch, when depressed, is configured to electrically connect the third PTT electrical terminal to the first PTT electrical terminal, and the fourth PTT electrical terminal to the second PTT electrical terminal, and thereby causing the microphone to be activated. The potentiometer, by adjusting a position of the second potentiometer electrical terminal to vary an electrical resistance of the potentiometer, is configured to control a volume of the earphone. When an external audio device is inserted into the audio jack, the volume of the earphone is transmitted to the external audio device.

In certain embodiments, at least one end of the connection wires is installed with a metal ring terminal.

In certain embodiments, the first connection wire is soldered at the first PTT electrical terminal, the fourth connection wire is soldered at the fourth PTT electrical terminal, the fifth connection wire is soldered at the first PTT electrical terminal, the sixth connection wire is soldered at the third PTT electrical terminal, the seventh connection wire is soldered at the second PTT electrical terminal, and the eighth connection wire is soldered at the first PTT electrical terminal.

In certain embodiments, the pin contact electrical connector further comprises an electrical connector pin F.

In certain embodiments, the housing further comprises channels or grooves for holding and securing one or more of the connection wires.

In certain embodiments, a method of producing the lightweight communication handset includes: molding a base of the housing; installing the earphone within the earphone cavity, the microphone within the microphone cavity, the PTT switch within the PTT switch cavity, the pin contact electrical connector within the pin contact electrical connector cavity, the audio jack within the audio jack cavity, and the potentiometer within the potentiometer cavity; directly connecting each of the respective connection wires to the respective earphone electrical terminals, microphone electrical terminals, PTT switch electrical terminals, electrical connector pins, audio jack electrical terminals, and potentiometer electrical terminals; and molding a top of the housing to the base of the housing to enclose the earphone, the microphone, the PTT switch, the pin contact electrical connector, the audio jack, and the potentiometer.

In certain embodiments, the method of producing the lightweight communication handset further involves directly molding the PTT switch, the pin contact electrical connector, and the connection wires into the housing.

BRIEF DESCRIPTION OF FIGURES

Various objects, features, and advantages of the disclosed subject matter can be more fully appreciated with reference to the following detailed description of the disclosed subject matter when considered in connection with the following drawings, in which like reference numerals identify like elements. While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive. Many of the figures presented herein are black and white representations of images originally created in color.

DETAILED DESCRIPTION

Figure 1B:
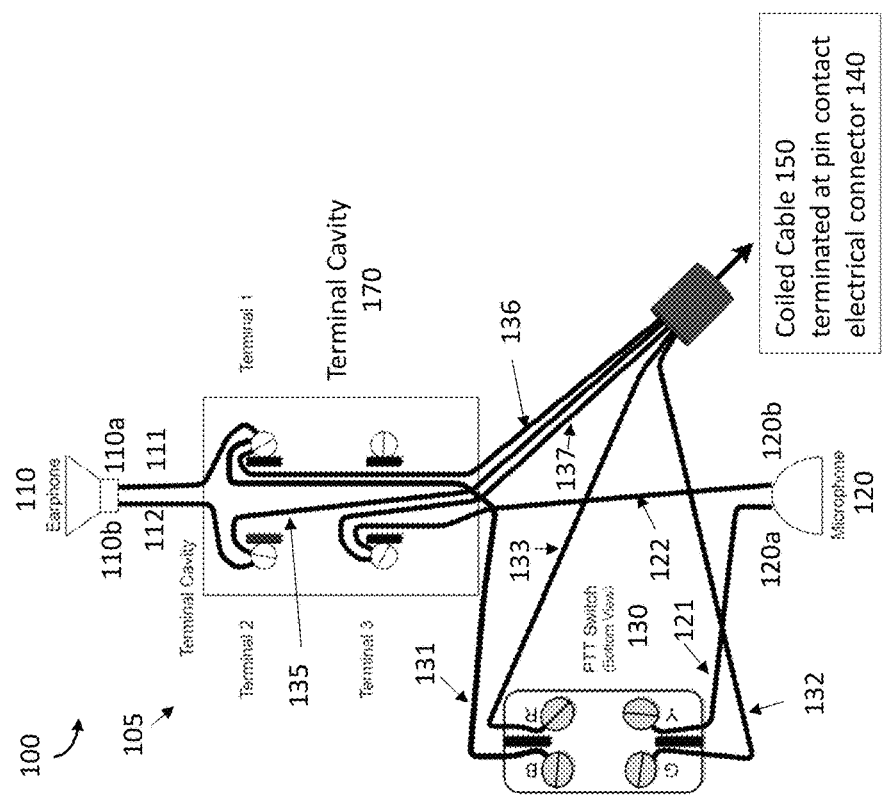
FIG. 1B is a wiring schematic of a tactical handset.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

As used herein, the phrase "directly connects" means electrically connecting two separate electrical terminals by means of a single, unbroken electrical conductor such as an electrical wire and without the use of any intervening electrical terminals. When used herein, the phrase "directly molded" means molding a material or shape over another molded material or shape to form an integrated product of the two. Unless otherwise specified, the term "terminal" used herein refers to an electrical terminal that electrically and mechanically joins electrical components (e.g., electrical conductors); and the term "pin" used herein refers to an electrical pin.

Tactical communication handsets (e.g., H-250/U, H-350U handsets) can be used with software-defined combat net radio devices. The design of a tactical handset includes a handle for holding handset components, i.e., an earphone, microphone, a PTT switch; connection wires (i.e., lead wires) for connecting the handset components; and a coiled cable that extends from an opening in the handle and carries appropriate connection wires that terminate at a 5- or 6-pin contact electrical connector; and the 5-pin or 6-pin contact electrical connector that is designed to connect the handset to a communication radio set. The handle includes separate space cavities for securing the components (i.e., the earphone, microphone, and the PTT switch). These space cavities provide adequate space for joining the terminals of the components with corresponding connection wires but not enough to extend the entire length of the connection wires or to accommodate additional wiring junctions required to connect the remaining connection wires.

To resolve this space constraint issue, the standard tactical handset handle design includes a terminal cavity, which is a separate space cavity that accommodates the connection wires and additional wire junctions. The terminal cavity is a key design feature of standard tactical handsets that facilitates assembly of all the components of the handset. However, this application recognizes that terminal cavity design has at least the following drawbacks. (1) The terminal cavity includes a number of wire joints, wire terminals, exposed and uninsulated wires, and screws that in turn create multiple failure points in the final handle assembly, adversely impacting the durability and life of the handset. (2) The terminal cavity adds hollow space to the handle design, thereby reducing the structural integrity and mechanical strength of the handle. (3) A terminal plate is needed to cover and seal off the terminal cavity, but it acts as another source of failure because the seal deteriorates or becomes damaged under field conditions. (4) Installation of the terminal plate involves forcing down the wires within the terminal cavity so that the terminal cavity is closed off by the terminal plate without wires protruding out of the terminal cavity, which may cause damage to the wire joints and/or contacting of the connection wires and thus an electrical short circuit, resulting in a malfunction or a total failure of the handset, and since the terminal plate is permanently installed the whole handset unit has to be scrapped in such a situation. (5) Including a terminal cavity involves additional assembling steps to join the connection wires at its terminals and molding of the terminal plate, which add to the production cost of the handset. (6) Installing the terminal plate to close the terminal cavity (e.g., using a rubber gasket under the terminal plate, which is then installed with tamper-proof screws, or using cement to seal the terminal plate over the terminal cavity) also adds to the manufacturing time and production cost.

The coiled cable of the standard tactical handset is installed by pulling the overmolded end of the coiled cable with connection wires through an opening in the handset handle. Having a coiled cable in the handset has its own disadvantages: 1) it adds weight to the handset, 2) the opening created for extending the coiled cable from the handle is a potential failure point because it is constantly subject to mechanical forces caused by the movement of the coiled cable during the handset operation, and 3) the interface between the handle opening and the molded end of the coiled cable creates another seal that deteriorates or becomes damaged, thus causing the handset to fail.

Embodiments of the invention aims to resolve the above-described problems associated with the standard tactical handsets, for example, by eliminating the need for having a terminal cavity, wire joints, unnecessary hollow spaces, and a coiled cable in the handset design.

Figure 1A:
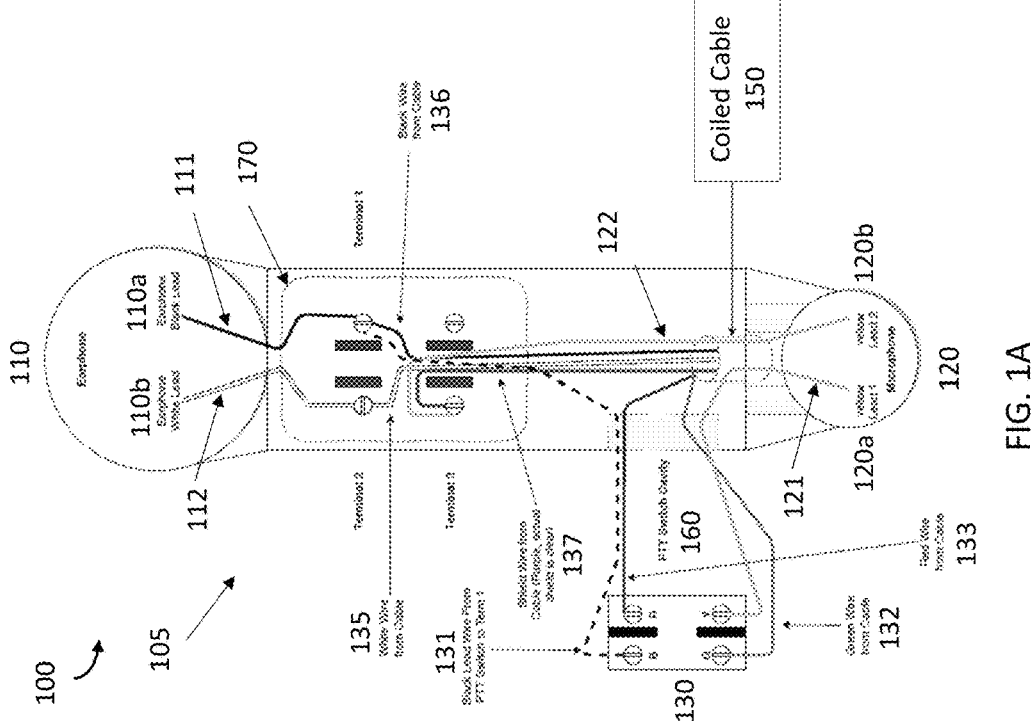
FIG. 1A is an illustration of a tactical handset.

Prior Art FIGS. 1A and 1B illustrate components and a wiring schematic of an exemplary tactical communication handset 100 that includes a terminal cavity and a coiled cable. The handset includes an earphone 110, a microphone 120, a Push-To-Talk (PTT) switch 130, handle 105, connection wires, a pin contact electrical connector 140, and a five or six conductor coiled cable 150 that terminates into the pin contact electrical connector 140. For example, the handset design includes a dynamic sound powered 1000-ohm earphone, 150-ohm microphone, a double pole and single throw PTT switch, and a five-conductor coil cord that terminates into a military audio connector. PTT switch cavity 160 serves to accommodate PTT switch 130 and associated terminal and wiring connections for connecting PTT switch 130 to other components such as earphone 110, microphone 120, and pin contact electrical connector 140. However, PTT switch cavity 160 alone (or in combination with an earphone cavity and a microphone cavity) does not provide adequate room to wire and connect all the components of handset 100. To address this space issue, standard tactical handsets include a terminal cavity 170 is provided within handle 105 that serves as a junction for 1) securing the connection wires that extend from earphone 110 and microphone 120 to pin contact electrical connector 150, and 2) the connection wire(s) that extends from earphone 110 to PTT switch 130. The ends of the connection wires that terminate at terminal cavity 170 and PTT switch cavity 160 are installed with metal terminal ring and are attached to respective terminals using screws. During manufacture, after the wires are connected at the terminals in the terminal cavity, any slack in the wires is forced into the terminal cavity and the terminal cavity is sealed off with a terminal plate (not shown). The terminal plate is secured to the handset (e.g., using a rubber gasket under the terminal plate, which is then installed with tamper-proof screws, or using cement to seal the terminal plate over the terminal cavity).

In certain embodiments, the handset disclosed in the application improves upon the existing tactical handsets (e.g., H-250/U handset) by reducing the weight and simplifying the manufacturing and assembly processes but without compromising the communication quality and structural strength of the handset. This is accomplished, in certain embodiments, by 1) molding in a 5- or 6-pin panel mount connector directly into the handle, thus eliminating a need to integrate a coiled cable with the handset; and/or 2) directly connecting the wires, that would otherwise be channeled via a terminal cavity, to the 5- or 6-pin panel mount connector, thereby eliminating the terminal cavity and associated connection wires, terminal pins, and screws. In certain embodiments, removing the coiled cable by directly molding the pin contact electrical connector into the handle and eliminating the terminal cavity simplifies the assembly of the handset, resulting in reduced production cost of the handset. In certain embodiments, the pin contact electrical connector (e.g., a panel mount military audio jack) is installed into a base of the handle, eliminating the need for a coiled cable to be installed in the handset. In certain embodiments, the pin contact electrical connector that replaces the coiled cable is a panel mount military audio jack.

Figure 2:
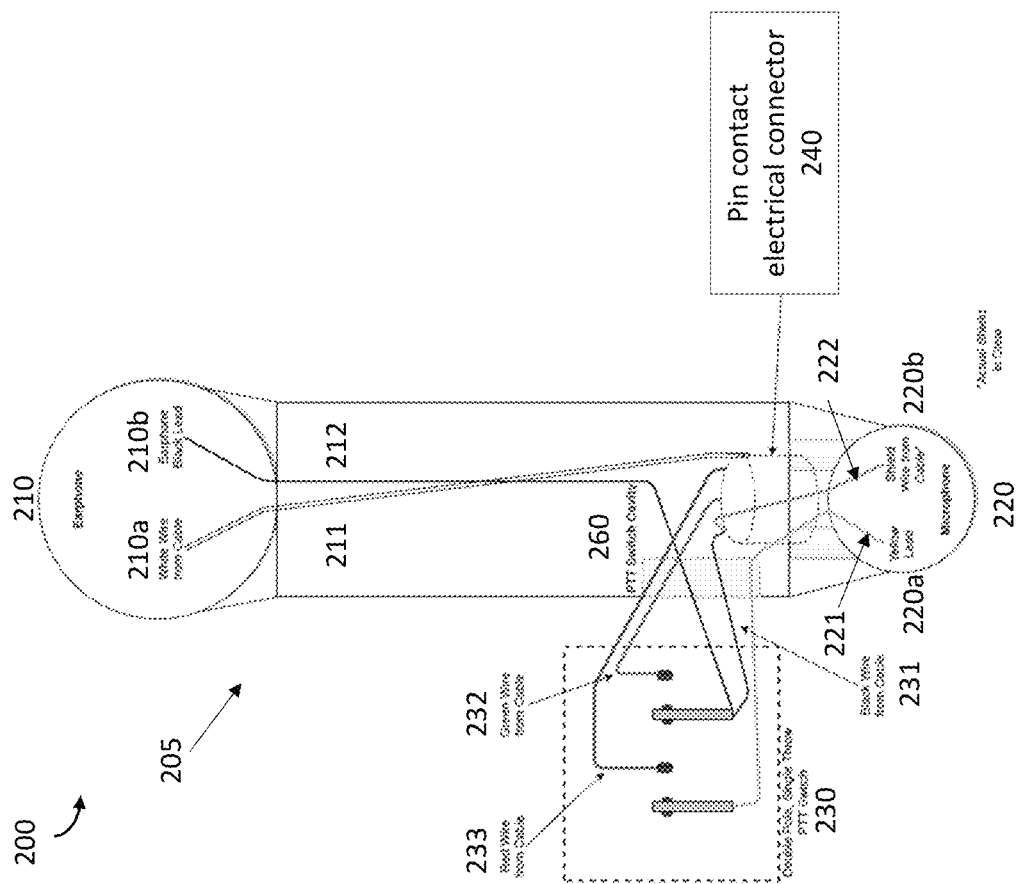
FIG. 2 is an illustration of a handset, according to some embodiments.

Referring to FIG. 2, handset 200 includes earphone 210, microphone 220, PTT switch (e.g., including contacts directly molded into the handle) 230, handle 205 including cavities for holding the earphone, microphone, and PTT switch, and pin contact electrical connector 240 that is directly integrated into handle 205. Handset 200 further includes connection wires 211, 212, 221, 222, 231, 232, and 233 to connect handset elements (e.g., earphone 210, microphone 220, PTT switch 230, pin contact electrical connector 240). In comparison to the handset as shown in FIG. 1, handset 200 neither includes a coiled cable nor a terminal cavity with accompanying wire joints and necessary hardware in the handle.

In certain embodiments, the handle has two sections—a substrate and an overlaying top section. The substrate section of the handle is produced using, for example, injection molding process and is designed as a base to hold handset elements including the earphone, microphone, PTT switch, and pin contact electrical connector, and includes cavity spaces to accommodate these elements and associated junctions and wiring. The molded substrate section also includes channels for securing and directing connection wires to various elements of the handset, according to certain embodiments. According to certain embodiments, handset elements (e.g., earphone, microphone, PTT switch, and pin contact electrical connector) and connection wires are secured and connected in their respective cavities and channels, and then the top section is injection molded on top of the substrate section, enclosing the elements and connection wires. In certain embodiments, the connection wires and the pin contact electrical connector are overmolded into the substrate section of the handle using multistep injection molding. In certain embodiments, the production of the handset involves: first, connecting the pin contact electrical connector and connection wires; next, overmolding the handle including the cavities for holding remaining handset elements (e.g., earphone, microphone, preassembled PTT switch); next, installing the remaining handset elements into respective molded cavities; and then, connecting the exposed lengths of the overmolded connection wires, soldering the earphone and microphone terminals and then covering and sealing them off, and wiring the PTT switch by screw terminals to the pin contact electrical connector via connection wires that are finished in ring terminals. In certain embodiments, the pin contact electrical connector and connection wires are connected in advance and next the connection wires that terminate at the PTT switch are soldered to the PTT switch electrical contacts. The remaining production steps involving overmolding the handle, installing and wiring the remaining handset elements (e.g., earphone, microphone, PTT switch bar actuator, dust cover, etc.) are performed subsequently, according to certain embodiments.

In certain embodiments, the connection wires are overmolded into the handset after attaching them to the switch contacts and pin contact electrical connector. In certain embodiments, after the overmolding of the wires is complete, the microphone and earphone elements are soldered to their appropriate wires, installed into their respective cavities, and sealed into the handset. In certain embodiments, the bar actuator is then installed into the switch cavity with the rubber dust cover and then installed into place with the switch cover and tamper-proof screws or some other method to ensure the switch mechanism is sealed and secure in the handset. In certain embodiments, the handset is then utilized with a variety of different cables that terminate with a U-229/U (5-pin) or U-329/U (6-pin) style connector. For example, a cable of appropriate length with both ends terminated in U-229/U connectors is used to connect the handset to a radio communication set. This design allows for the handset to be replaceable without having to replace the cable, effectively reducing the amount of waste that is generated in case only the handset or the cable has failed compared to prior integrated systems where the entire system needs to be discarded. According to certain embodiments, a system of two handsets with one connecting cable terminated in U-229 connectors on both ends weighs less than two standard tactical handsets. In critical tactical missions and operations where carrying a replacement communication handset is necessary to maintain communication for the success of the mission in case the first handset fails, such system of two handsets with one connecting cable is desirable because of its lower overall weight compared to the two standard tactical handsets.

In certain embodiments, the PTT switch is a PTT bar actuator. In certain embodiments, a switch rubber dust cover (such as the cover that the H-250/U utilizes) is included in the handset to protect the PTT switch from the elements. In certain embodiments, the PTT switch is a double pole, single throw, bar actuated type, with a positive detent action and meets the performance requirements of MIL-PRF-49078. In certain embodiments, the handset does not require screws to attach the connection wires.

In certain embodiments, the terminal cavity is left hollowed out, slimmed down, or designed in such a manner as to reduce the amount of material used if performance and structural integrity are not compromised. Since the terminal cavity no longer needs to be wired, the overall time to assemble the handset is reduced which in turn reduces the overall production cost. Simplifying the assembly and manufacturing processes and reducing the amount of material used in the handset drives the cost to produce a single unit down as well.

Figure 3B:
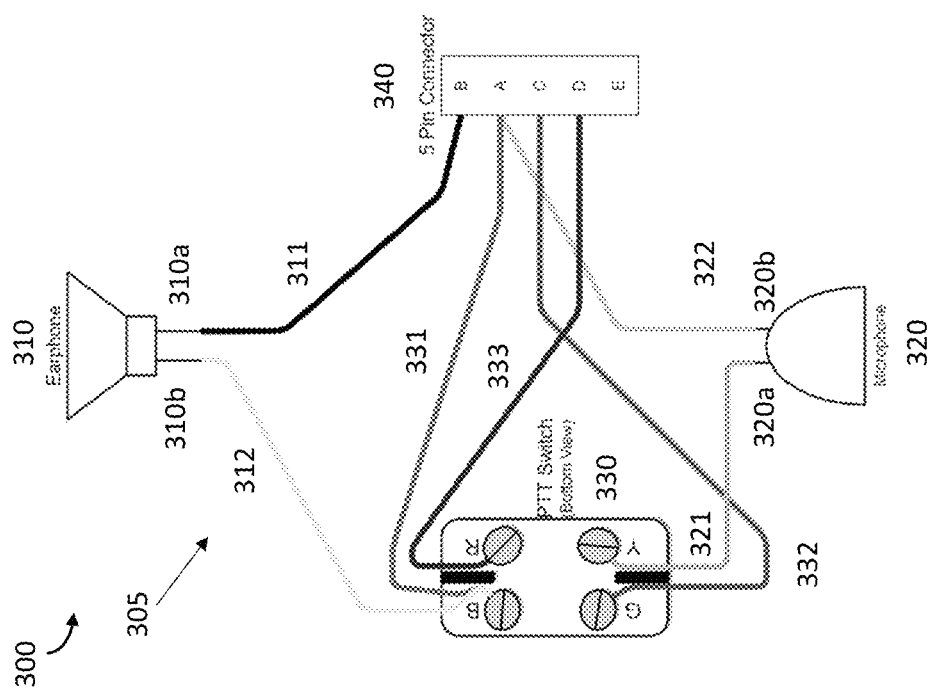
FIG. 3B is a wiring schematic of a handset of FIG. 3A after installing the connection wires having ring terminals, according to some embodiments.

FIG. 3B shows the wiring schematic of handset 300 in which 5-pin contact electrical connector 340 is directly integrated into handle 305, according to certain embodiments. In certain embodiments, connection wires 311 and 312 directly connect terminal 310*a* of earphone 310 to B-pin of 5-pin contact electrical connector 340, and terminal 310*b* of earphone 310 to terminal B of PTT switch, respectively. Connection wires 321 and 322 directly connect terminal 320*a* of microphone 320 to terminal Y of PTT switch, and terminal 320*b* of microphone 320 to A-pin of 5-pin contact electrical connector 340, respectively. Connection wire 331 directly connects terminal B of PTT switch 330 to A-pin of 5-pin contact electrical connector 340. Connection wire 332 directly connects terminal G of PTT switch 330 to C-pin of 5-pin contact electrical connector 340. Connection wire 333 directly connects terminal R of PTT switch 330 to D-pin of 5-pin contact electrical connector 340.

Figure 3A:
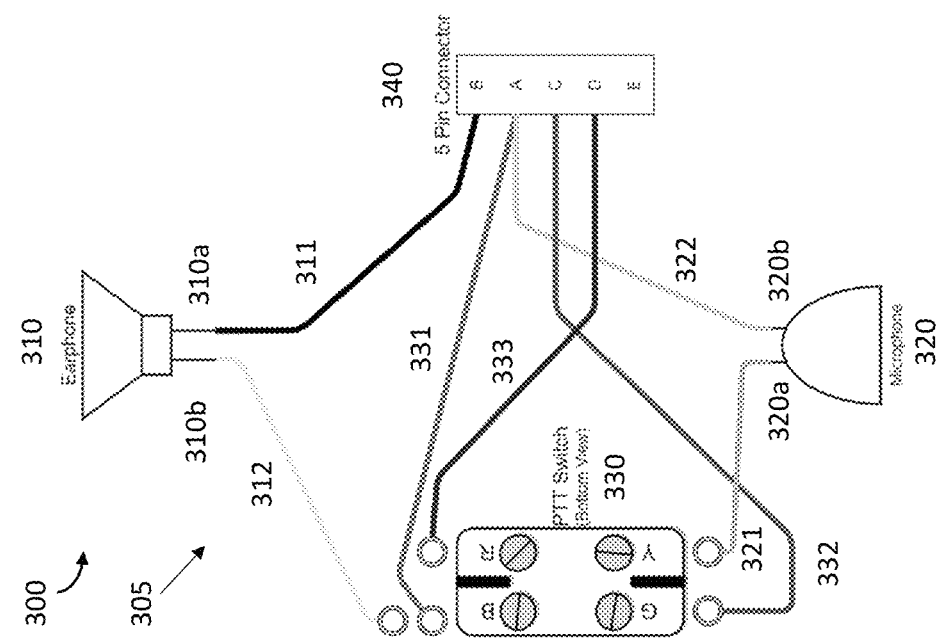
FIG. 3A is a wiring schematic of a handset before installing the connection wires that have ring terminals, according to some embodiments.

Referring to FIG. 3A, the ends of connection wires 312, 321, 331, 332, and 333 that terminate at terminals B, Y, B, G, and R of PTT switch 330, respectively, are installed with metal ring terminals. In certain embodiments, these metal ring terminals are attached to respective terminals of PTT switch 330 using screws as shown in FIG. 3B. When PTT switch 330 is open (i.e., not depressed), earphone 310 is operational. When PTT switch 330 is depressed, it enables terminal G and terminal Y of PTT switch 330 to electrically contact terminal B and terminal R of PTT switch 330, respectively, allowing microphone 320 to become activated. When compared to the standard tactical handset of FIG. 1, the wiring scheme disclosed in FIG. 3 eliminates 1) the terminal cavity and associated wires, wire joint, ring terminals, and screws because no wire joints (i.e., a terminal or junction for connecting two wires) are present in the design; 2) the coiled cable because 5-pin contact electrical connector directly attaches to the handle; and 3) opening to extend the coiled cable from the handle because there is no coiled cable in the design. Therefore, in certain aspects, handset 300 of FIG. 3 is lighter, and more durable and reliable than the standard tactical handsets.

In certain embodiments, the PTT switch is directly integrated into the handset with the PTT switch contacts being soldered to the respective connection wires. In such embodiments, a bar actuator is the only part of the PTT switch that requires installation. Because this configuration avoids the use of terminal joints (including screws) and ring terminals by directly soldering the connection wires to the terminals of the PTT switch, this configuration further improves the durability and reliability of the handset.

Figure 4:
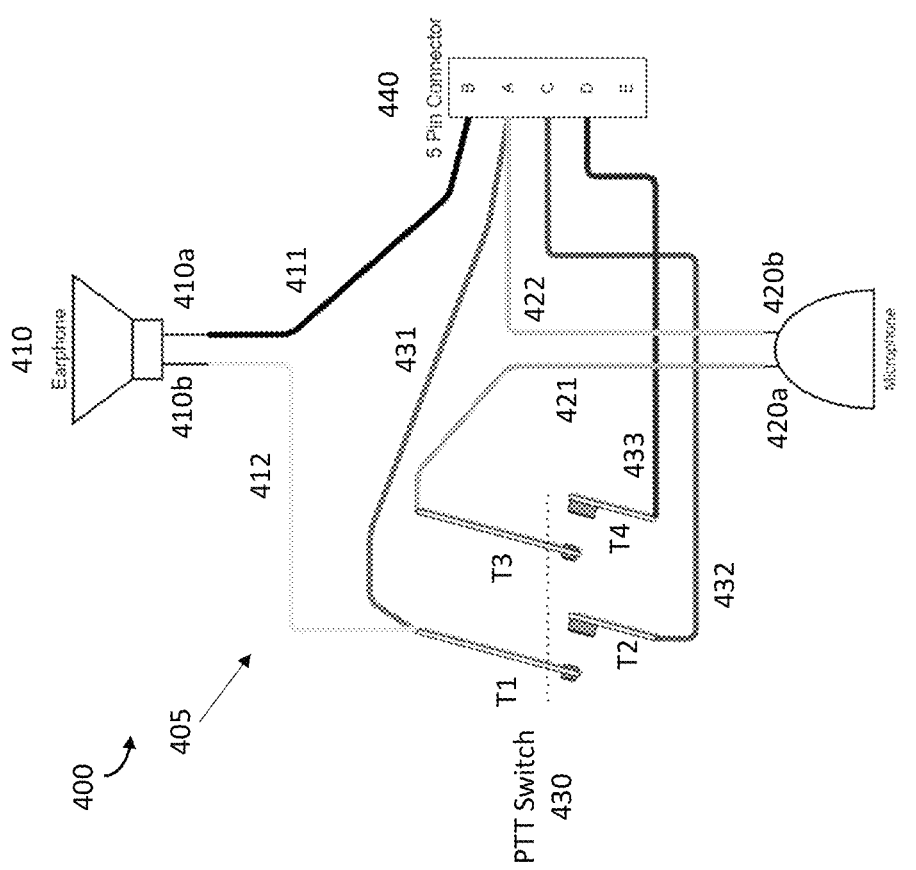
FIG. 4 is a wiring schematic of a handset that is fully wired and soldered at switch contacts, according to some embodiments.

FIG. 4 shows the wiring schematic of handset 400, according to certain embodiments. Connection wires 411 and 412 directly connect terminal 410*a* of earphone 410 to B-pin of 5-pin contact electrical connector 440, and terminal 410*b* of earphone 410 to terminal T1 of PTT switch 430, respectively. Connection wires 421 and 422 directly connect terminal 420*a* of microphone 420 to terminal T3 of PTT switch 430, and terminal 420*b* of microphone 420 to A-pin of 5-pin contact electrical connector 440, respectively. Connection wire 431 directly connects terminal T1 of PTT switch 430 to A-pin of 5-pin contact electrical connector 440. Connection wire 432 directly connects terminal T2 of PTT switch 430 to C-pin of 5-pin contact electrical connector 440. Connection wire 433 directly connects terminal T4 of PTT switch 430 to D-pin of 5-pin contact electrical connector 440. Terminals T1, T2, T3, and T4 of PTT switch 430 are solder joined with respective connection wires 412 and 431, 432, 421, and 433, respectively. When PTT switch 430 is open (i.e., not depressed), earphone 410 is operational. When PTT switch 430 is depressed, it enables terminal T1 and terminal T3 of PTT switch 430 to electrically contact terminal T2 and terminal T4 of PTT switch 430, respectively, allowing microphone 420 to become activated. According to certain embodiments, this configuration eliminates the use of wire joints and ring terminals altogether.

Referring to FIGS. 3A, 3B, and 4, although a 5-pin contact electrical connector (according to M55116/9 standard) is depicted according to certain embodiments, according to other embodiments, a 6-pin contact electrical connector (according to M55116/10 standard) is used. In certain embodiments, the 5-pin contact electrical connector and the 6-pin contact electrical connector leave the E pin open. In certain embodiments, the 6-pin contact electrical connector also leaves the F pin open. Using the 6-pin version according to certain embodiments does not change the functionality of handset described with respect to FIGS. 3A, 3B, and 4.

Figure 5B:
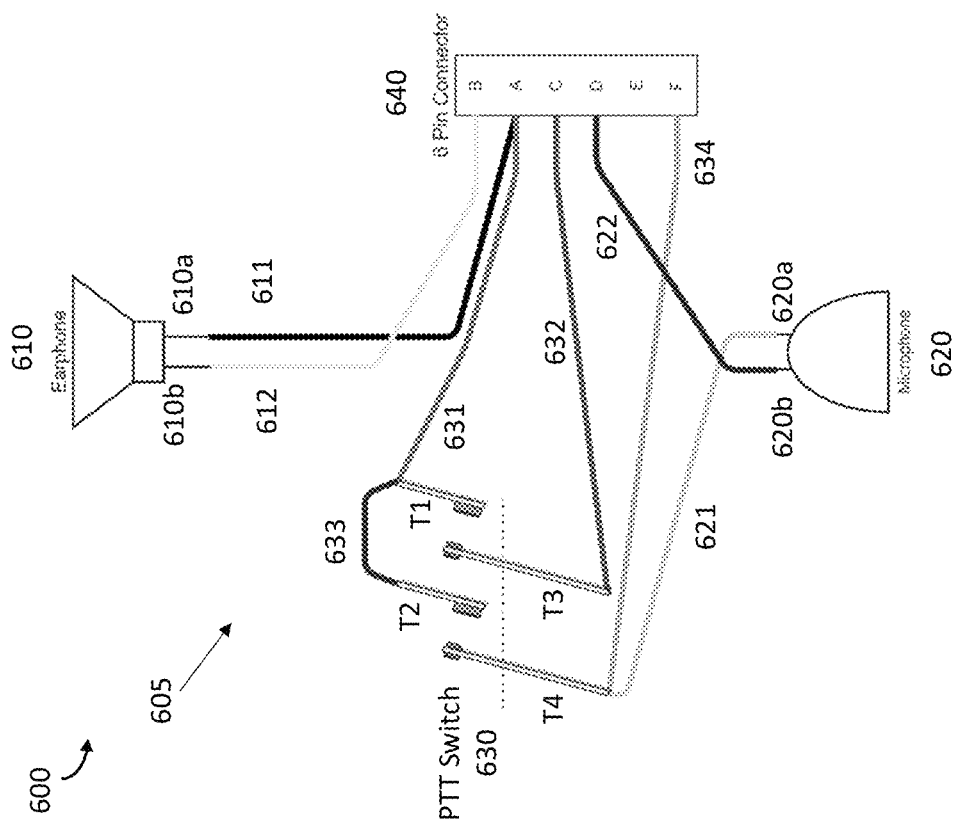
FIG. 5B is a wiring schematic of a handset in duplex operation using a 6-pin contact electrical connector and utilizing soldered contacts at a PTT switch, according to some embodiments of the present disclosure.
Figure 5A:
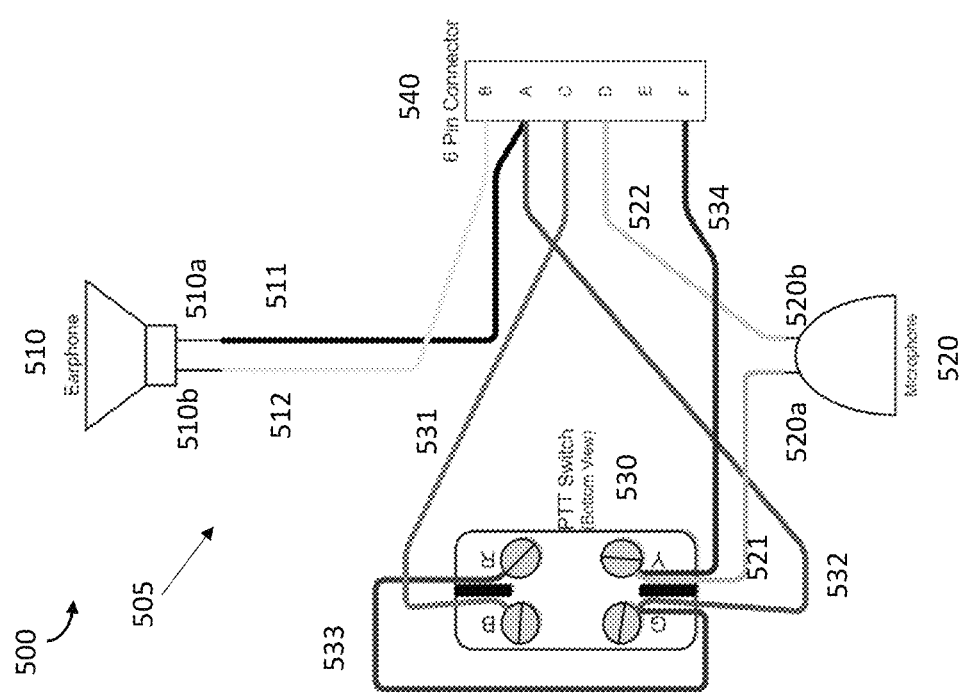
FIG. 5A is a wiring schematic of a handset in duplex operation using a 6-pin contact electrical connector, according to some embodiments.

In certain embodiments, the handset is used for duplex operation that allows simultaneous operation of the earphone and microphone. FIG. 5A shows the wiring scheme to accomplish duplex operation using a 6-pin contact electrical connector. Connection wires 511 and 512 directly connect terminal 510a of earphone 510 to A-pin of 6-pin contact electrical connector 540, and terminal 510b of earphone 510 to B-pin of 6-pin contact electrical connector 640, respectively. Connection wires 521 and 522 directly connect terminal 520a of microphone 520 to terminal Y of PTT switch 530, and terminal 520b of microphone 520 to D-pin of 6-pin contact electrical connector 540, respectively. Connection wire 531 directly connects terminal B of PTT switch 530 to C-pin of 6-pin contact electrical connector 540. Connection wire 532 directly connects terminal G of PTT switch 530 to A-pin of 6-pin contact electrical connector 540. Connection wire 533 directly connects terminal R and terminal G of PTT switch 530. Connection wire 534 directly connects terminal Y of PTT switch 530 to F-pin of 6-pin contact electrical connector 540. In certain embodiments, the ends of connection wires 521, 531, 532, 533, and 534 that terminate at terminals Y, B, G, G/R, and Y of PTT switch 530, respectively, are installed with ring terminals. In certain embodiments, these ring terminals are attached to respective terminals of PTT switch 530 using screws. When PTT switch 530 is open (i.e., not depressed), earphone 510 is operational. When PTT switch 530 is depressed, it enables terminal G and terminal Y of PTT switch 530 to electrically contact terminal B and terminal R of PTT switch 530, respectively, allowing simultaneous activation of microphone 520 and earphone 510.

In certain embodiments, the handset with duplex operation includes a PTT switch that is directly integrated into the handset with the PTT switch contacts soldered to respective connection wires. FIG. 5B shows handset 600 in duplex configuration with components fully wired and soldered to switch contacts, according to certain embodiments. Connection wires 611 and 612 directly connect terminal 610a of earphone 610 to A-pin of 6-pin contact electrical connector 640, and terminal 610b of earphone 610 to B-pin of 6-pin contact electrical connector 640, respectively. Connection wires 621 and 622 directly connect terminal 620a of microphone 620 to terminal T4 of PTT switch 640, and terminal 620b of microphone 620 to D-pin of 6-pin contact electrical connector 640, respectively. Connection wire 631 directly connects terminal T1 of PTT switch 630 to A-pin of 6-pin contact electrical connector 640. Connection wire 632 directly connects terminal T3 of PTT switch 630 to C-pin of 6-pin contact electrical connector 640. Connection wire 633 directly connects terminal T1 and terminal T2 of PTT switch 630. Connection wire 634 directly connects terminal T4 of PTT switch 630 to F-pin of 6-pin contact electrical connector 640. Terminals T1, T2, T3, and T4 of PTT switch 630 are solder joined with respective connection wires 631 and 633, 633, 632, and 621 and 634, respectively. When PTT switch 630 is open (i.e., not depressed), earphone 610 is operational. When PTT switch 630 is depressed, it enables terminal T1 and terminal T2 of PTT switch 630 to electrically contact terminal T3 and terminal T4 of PTT switch 630, respectively, allowing simultaneous activation of microphone 620 and earphone 610.

Figure 6:
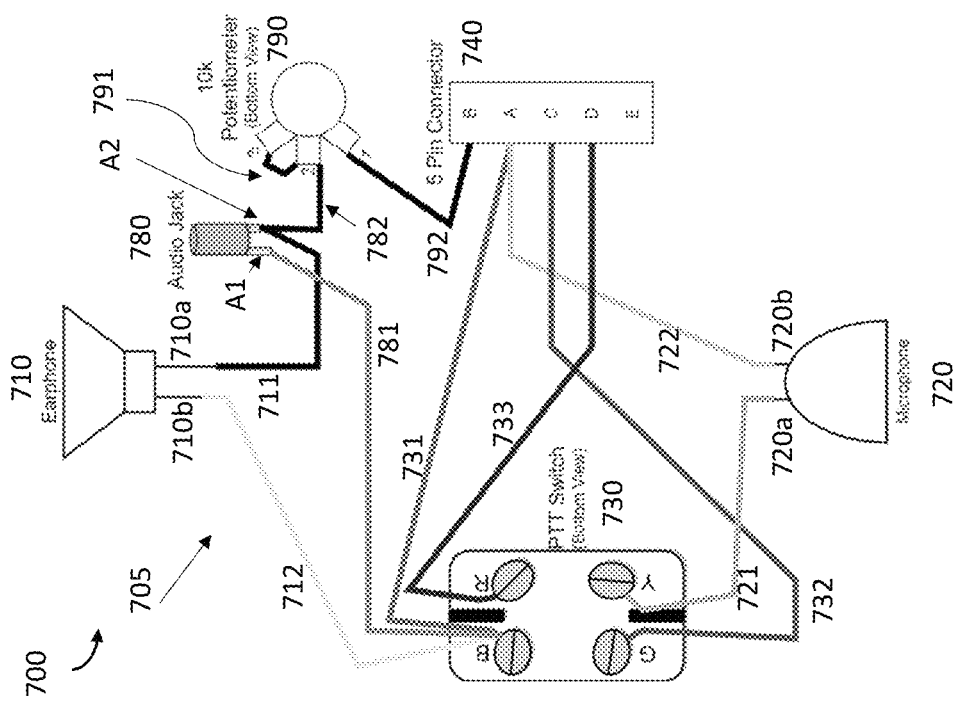
FIG. 6 is a wiring schematic of a handset with volume control and earbud (VCEB) audio jack, according to some embodiments of the present disclosure.

In certain embodiments, the handset provides volume control and capability to connect to an external audio source such as an earbud. FIG. 6 shows handset with a volume control and earbud (VCEB) audio jack, a PTT switch with wires and wire joints fully installed, according to certain embodiments. Connection wires 711 and 712 directly connect terminal 710a of earphone 710 to terminal A1 of audio jack 780, and terminal 710b of earphone 710 to B-pin of contact electrical connector 740, respectively. Connection wires 721 and 722 directly connect terminal 720a of microphone 720 to terminal Y of PTT switch 730, and terminal 720b of microphone 720 to A-pin of 5-pin contact electrical connector 740, respectively. Connection wire 731 directly connects terminal B of PTT switch 730 to A-pin of 5-pin contact electrical connector 740. Connection wire 732 directly connects terminal G of PTT switch 730 to C-pin of contact electrical connector 740. Connection wire 733 directly connects terminal R of PTT switch 730 to D-pin of 5-pin contact electrical connector 740. Connection wire 781 directly connects terminal A1 of audio jack 780 to terminal B of PTT switch 730. Connection wire 782 directly connects terminal A2 of audio jack 780 to terminal 2 of variable resistance potentiometer 790. Connection wire 791 directly connects terminal 2 and terminal 3 of potentiometer 790. Connection wire 792 directly connects terminal 1 of potentiometer 790 to B-pin of 5-pin contact electrical connector 740. In certain embodiments, the ends of connection wires 721, 731, 732, 733, and 781 that terminate at terminals Y, B, G, R, and B of PTT switch 730, respectively, are installed with metal ring terminals. In certain embodiments, these metal ring terminals are attached to respective terminals of PTT switch 730 using screws. When PTT switch 730 is open (i.e., not depressed), earphone 710 is operational. When PTT switch 730 is depressed, it enables terminal G and terminal Y of PTT switch 730 to electrically contact terminal B and terminal R of PTT switch 730, respectively, allowing microphone 720 to become activated. Connecting a suitable external audio device to audio jack 780 allows the volume to be transmitted to the external audio device. Turning of the potentiometer 790 allows for the volume control of earphone 710 or the external audio device inserted into audio jack 780.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A lightweight communication handset comprising:
a housing, the housing comprising an earphone cavity, a microphone cavity, a PTT switch cavity, and a pin contact electrical connector cavity, and wherein the housing does not include a terminal cavity;
an earphone located at least partially within the earphone cavity, the earphone having earphone electrical terminals comprising a first earphone electrical terminal and a second earphone electrical terminal;
a microphone located at least partially within the microphone cavity, the microphone having microphone electrical terminals comprising a first microphone electrical terminal and a second microphone electrical terminal;
a push-to-talk (PTT) switch located at least partially within the PTT switch cavity, the PTT switch having PTT switch electrical terminals comprising a first PTT electrical terminal, a second PTT electrical terminal, a third PTT electrical terminal, and a fourth PTT electrical terminal;
a pin contact electrical connector located at least partially within the pin contact electrical connector cavity, the pin contact electrical connector having electrical connector pins comprising electrical connector pin A, electrical connector pin B, electrical connector pin C, electrical connector pin D, and electrical connector pin E; and
connection wires, the connection wires comprising a first connection wire, a second connection wire, a third connection wire, a fourth connection wire, a fifth connection wire, a sixth connection wire, and a seventh connection wire,
wherein:
the first connection wire directly connects the first earphone electrical terminal to the first PTT electrical terminal,
the second connection wire directly connects the second earphone electrical terminal to the electrical connector pin B,
the third connection wire directly connects the first microphone terminal to the electrical connector pin A,
the fourth connection wire directly connects the second microphone electrical terminal to the fourth PTT electrical terminal,
the fifth connection wire directly connects the first PTT electrical terminal to the electrical connector pin A,
the sixth connection wire directly connects the third PTT electrical terminal to the electrical connector pin C,
the seventh connection wire directly connects the second PTT electrical terminal to the electrical connector pin D,
wherein
the PTT switch, when not depressed, is configured to cause the earphone to be activated,
the PTT switch, when depressed, is configured to electrically connect the third PTT electrical terminal to the first PTT electrical terminal, and the fourth PTT electrical terminal to the second PTT electrical terminal, and thereby cause the microphone to be activated.

2. The lightweight communication handset of claim 1, wherein at least one end of the connection wires is installed with a metal ring terminal.

3. The lightweight communication handset of claim 1, wherein the first connection wire is soldered at the first PTT terminal, the fifth connection wire is soldered at the first PTT terminal, the sixth connection wire is soldered at the third PTT terminal, and the seventh connection wire is soldered at the second PTT terminal.

4. The lightweight communication handset of claim 1, wherein the pin contact electrical connector further comprises an electrical connector pin F.

5. The lightweight communication handset of claim 1, wherein the housing further comprises channels or grooves for holding and securing one or more of the connection wires.

6. A method of producing the lightweight communication handset of claim 1, the method comprising:
molding a base of the housing;
installing the earphone within the earphone cavity, the microphone within the microphone cavity, the PTT switch within the PTT switch cavity, and the pin contact electrical connector within the pin contact electrical connector cavity;
directly connecting each of the respective connection wires to the respective earphone electrical terminals, microphone electrical terminals, PTT switch electrical terminals, and electrical connector pins; and
molding a top of the housing to the base of the housing to enclose the earphone, the microphone, the PTT switch, and the pin contact electrical connector.

7. The method of producing the lightweight communication handset of claim 6, further comprising directly molding the PTT switch, the pin contact electrical connector, and the connection wires into the housing.

8. A lightweight communication handset comprising:
a housing, the housing comprising an earphone cavity, a microphone cavity, a PTT switch cavity, and a pin contact electrical connector cavity, and wherein the housing does not include a terminal cavity;
an earphone located at least partially within the earphone cavity, the earphone having earphone electrical terminals comprising a first earphone electrical terminal and a second earphone electrical terminal;
a microphone located at least partially within the microphone cavity, the microphone having microphone electrical terminals comprising a first microphone electrical terminal and a second microphone electrical terminal;
a push-to-talk (PTT) switch located at least partially within the PTT switch cavity, the PTT switch having PTT switch electrical terminals comprising a first PTT electrical terminal, a second PTT electrical terminal, a third PTT electrical terminal, and a fourth PTT electrical terminal;
a pin contact electrical connector located at least partially within the pin contact electrical connector cavity, the pin contact electrical connector having electrical connector pins comprising electrical connector pin A, electrical connector pin B, electrical connector pin C, electrical connector pin D, electrical connector pin E, and electrical connector pin F; and
connection wires, the connection wires comprising a first connection wire, a second connection wire, a third connection wire, a fourth connection wire, a fifth connection wire, a sixth connection wire, a seventh connection wire, and an eighth connection wire,
wherein:
the first connection wire directly connects the first earphone electrical terminal to the electrical connector pin B, the second connection wire directly connects the second earphone electrical terminal to the electrical connector pin A,
the third connection wire directly connects the first microphone electrical terminal to the electrical connector D,
the fourth connection wire directly connects the second microphone electrical terminal to the fourth PTT electrical terminal,
the fifth connection wire directly connects the first PTT electrical terminal to the electrical connector pin C,
the sixth connection wire directly connects the second PTT electrical terminal to the third PTT electrical terminal,
the seventh connection wire directly connects the third PTT electrical terminal to the electrical connector pin A,
the eighth connection wire directly connects the fourth PTT electrical terminal to the electrical connector pin F,
wherein:
the PTT switch, when not depressed, is configured to cause the earphone to be activated,
the PTT switch, when depressed, is configured to electrically contact the third PTT electrical terminal to the first PTT electrical terminal, and the fourth PTT electrical terminal to the second PTT electrical terminal, and thereby cause the earphone and the microphone to be simultaneously activated.

9. The lightweight communication handset of claim 8, wherein at least one end of the connection wires is installed with a metal ring terminal.

10. The lightweight communication handset of claim 8, wherein the fourth connection wire is soldered at the fourth PTT electrical terminal, the fifth connection wire is soldered at the first PTT electrical terminal, the sixth connection wire is soldered at the second PTT electrical terminal and the third PTT electrical terminal, the seventh connection wire is soldered at the third PTT electrical terminal, and the eighth connection wire is soldered at the fourth PTT electrical terminal.

11. The lightweight communication handset of claim 8, wherein the housing further comprises channels or grooves for holding and securing the connection wires.

12. A method of producing the lightweight communication handset of claim 8, the method comprising:
molding a base of the housing;
installing the earphone within the earphone cavity, the microphone within the microphone cavity, the PTT switch within the PTT switch cavity, and the pin contact electrical connector within the pin contact electrical connector cavity;
directly connecting each of the respective connection wires to the respective earphone electrical terminals, microphone electrical terminals, PTT switch electrical terminals, and electrical connector pins; and
molding a top of the housing to the base of the housing to enclose the earphone, the microphone, the PTT switch, and the pin contact electrical connector.

13. The method of producing the lightweight communication handset of claim 12, further comprising directly molding the PTT switch, the pin contact electrical connector, and the connection wires into the housing.

14. A lightweight communication handset comprising:
a housing, the housing comprising an earphone cavity, a microphone cavity, a PTT switch cavity, a pin contact electrical connector cavity, an audio jack cavity, and a potentiometer cavity, and wherein the housing does not include a terminal cavity;
an earphone located at least partially within the earphone cavity, the earphone having earphone electrical terminals comprising a first earphone electrical terminal and a second earphone electrical terminal;
a microphone located at least partially within the microphone cavity, the microphone having microphone electrical terminals comprising a first microphone electrical terminal and a second microphone electrical terminal;
a push-to-talk (PTT) switch located at least partially within the PTT switch cavity, the PTT switch having PTT switch electrical terminals comprising a first PTT electrical terminal, a second PTT electrical terminal, a third PTT electrical terminal, and a fourth PTT electrical terminal;
a pin contact electrical connector located at least partially within the pin contact electrical connector cavity, the pin contact electrical connector having electrical connector pins comprising electrical connector pin A, electrical connector pin B, electrical connector pin C, electrical connector pin D, and electrical connector pin E;
an audio jack located at least partially within the audio jack cavity, the audio jack having audio jack electrical terminals comprising a first audio jack electrical terminal and a second audio jack electrical terminal;
a potentiometer located at least partially within the potentiometer cavity, the potentiometer having potentiometer electrical terminals comprising a first potentiometer electrical terminal and a second potentiometer electrical terminal; and
connection wires, the connection wires comprising a first connection wire, a second connection wire, a third connection wire, a fourth connection wire, a fifth connection wire, a sixth connection wire, a seventh connection wire, an eighth connection wire, a ninth connection wire, a tenth connection wire, and an eleventh connection wire, wherein:
the first connection wire directly connects the first earphone electrical terminal to the first PTT electrical terminal,
the second connection wire directly connects the second earphone electrical terminal to the second audio jack terminal,
the third connection wire directly connects the first microphone electrical terminal to the electrical connector pin A,
the fourth connection wire directly connects the second microphone terminal to the fourth PTT electrical terminal,
the fifth connection wire directly connects the first PTT electrical terminal to the electrical connector pin A,
the sixth connection wire directly connects the third PTT electrical terminal to the electrical connector pin C,
the seventh connection wire directly connects the second PTT electrical terminal to the electrical connector pin D,
the eighth connection wire directly connects the first audio jack electrical terminal to the first PTT electrical terminal,
the ninth connection wire directly connects the second audio jack electrical terminal to the second potentiometer electrical terminal, the tenth connection wire directly connects the second potentiometer electrical terminal to the third potentiometer electrical terminal, the eleventh connection wire directly connects the first potentiometer electrical terminal to the electrical connector pin C, wherein the PTT switch, when not depressed, is configured to cause the earphone to be activated, the PTT switch, when depressed, is configured to electrically connect the third PTT electrical terminal to the first PTT electrical terminal, and the fourth PTT electrical terminal to the second PTT electrical terminal, and thereby cause the microphone to be activated, the potentiometer, by adjusting a position of the second potentiometer electrical terminal to vary an electrical resistance of the potentiometer, is configured to control a volume of the earphone, when an external audio device is inserted into the audio jack, the volume of the earphone is transmitted to the external audio device.

15. The lightweight communication handset of claim 14, wherein at least one end of the connection wires is installed with a metal ring terminal.

16. The lightweight communication handset of claim 14, wherein the first connection wire is soldered at the first PTT electrical terminal, the fourth connection wire is soldered at the fourth PTT electrical terminal, the fifth connection wire is soldered at the first PTT electrical terminal, the sixth connection wire is soldered at the third PTT electrical terminal, the seventh connection wire is soldered at the second PTT electrical terminal, and the eighth connection wire is soldered at the first PTT electrical terminal.

17. The lightweight communication handset of claim 14, wherein the pin contact electrical connector further comprises an electrical connector pin F.

18. The lightweight communication handset of claim 14, wherein the housing further comprises channels or grooves for holding and securing one or more of the connection wires.

19. A method of producing the lightweight communication handset of claim 14, the method comprising:

molding a base of the housing;

installing the earphone within the earphone cavity, the microphone within the microphone cavity, the PTT switch within the PTT switch cavity, the pin contact electrical connector within the pin contact electrical connector cavity, the audio jack within the audio jack cavity, and the potentiometer within the potentiometer cavity;

directly connecting each of the respective connection wires to the respective earphone electrical terminals, microphone electrical terminals, PTT switch electrical terminals, electrical connector pins, audio jack electrical terminals, and potentiometer electrical terminals; and molding a top of the housing to the base of the housing to enclose the earphone, the microphone, the PTT switch, the pin contact electrical connector, the audio jack, and the potentiometer.

20. The method of producing the lightweight communication handset of claim 19, further comprising directly molding the PTT switch, the pin contact electrical connector, and the connection wires into the housing.

* * * * *